June 6, 1950  J. R. MUNTER  2,510,245
SELF-PROPELLED SWATHER
Filed April 12, 1948  4 Sheets-Sheet 1

J. R. Munter
INVENTOR

June 6, 1950 J. R. MUNTER 2,510,245
SELF-PROPELLED SWATHER
Filed April 12, 1948 4 Sheets-Sheet 2
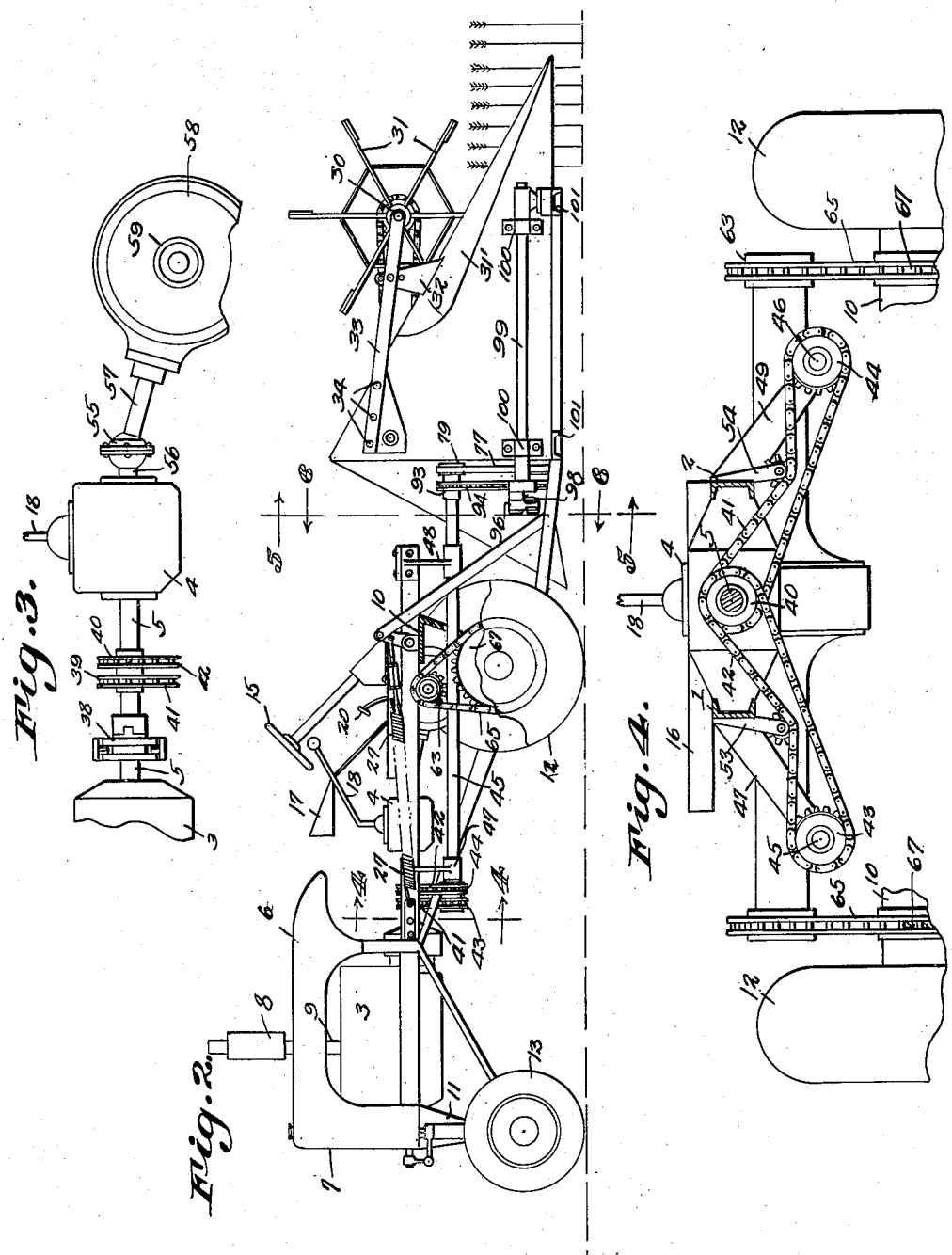
J. R. Munter
INVENTOR
BY C. A. Snow & Co.
ATTORNEYS.

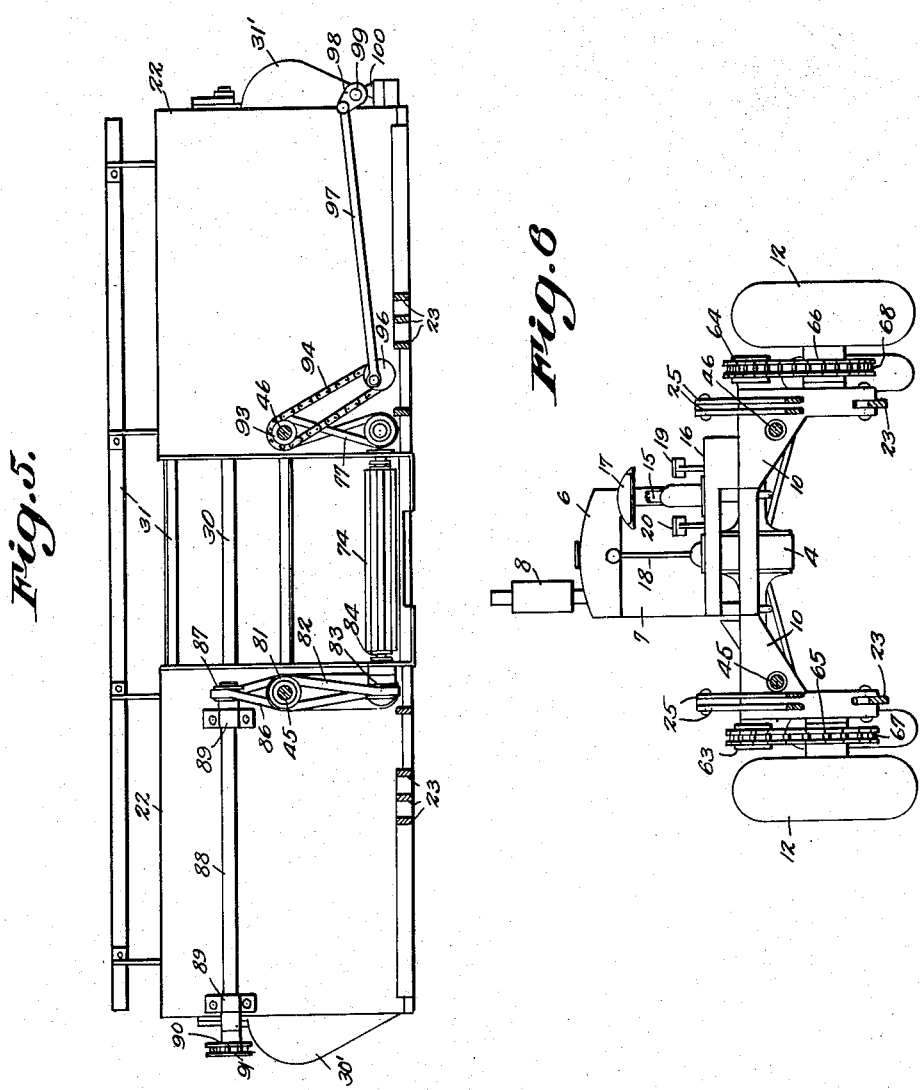

June 6, 1950   J. R. MUNTER   2,510,245
SELF-PROPELLED SWATHER
Filed April 12, 1948   4 Sheets-Sheet 4

J. R. Munter
INVENTOR
BY
ATTORNEYS.

Patented June 6, 1950

2,510,245

UNITED STATES PATENT OFFICE 2,510,245

SELF-PROPELLED SWATHER

John R. Munter, Wolverton, Minn.

Application April 12, 1948, Serial No. 20,549

1 Claim. (Cl. 56—23)

This invention relates to improvements in self-propelled swathers.

An object of the invention is to provide an improved self-propelled swather having its own motor and provided with high axles whereby the swath will readily pass under them as it is fed from the middle of the platform, thus preventing the doubling of the swath when a field is started to be harvested.

Another object of the invention is to provide an improved self-propelled swather having its own motor for propelling the same, and power take-off means for actuating a pair of transversely extending oppositely disposed drapers or endless conveyors and a centrally disposed draper or endless conveyor for receiving the cut grain from said first-mentioned drapers or endless conveyors for discharging the swath centrally and rearwardly from the swather.

A further object of the invention is to provide an improved form of wheel supported self-propelled harvester or swather having its own motor for propelling the same, and a plurality of power take-offs therefrom for respectively operating a cutter bar and draper or endless conveyor, and a reel and an oppositely disposed draper or endless conveyor.

A still further object of the invention is to provide an improved form of wheel supported, power driven harvester or swather which will be highly efficient in operation and relatively inexpensive to manufacture and produce.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 2 is a side elevation of the improved harvester or swather.

Figure 3 is a detail side elevation of the differential and transmission assembly for the swather.

Figure 4 is a partial sectional view taken on the line 4—4 of Figure 2.

Figure 5 is a partial sectional view taken on the line 5—5 of Figure 2.

Figure 6 is a partial sectional view taken on the line 6—6 of Figure 2.

Like characters of reference are used throughout the following specification and the accompanying drawings to designate corresponding parts.

Figure 1:
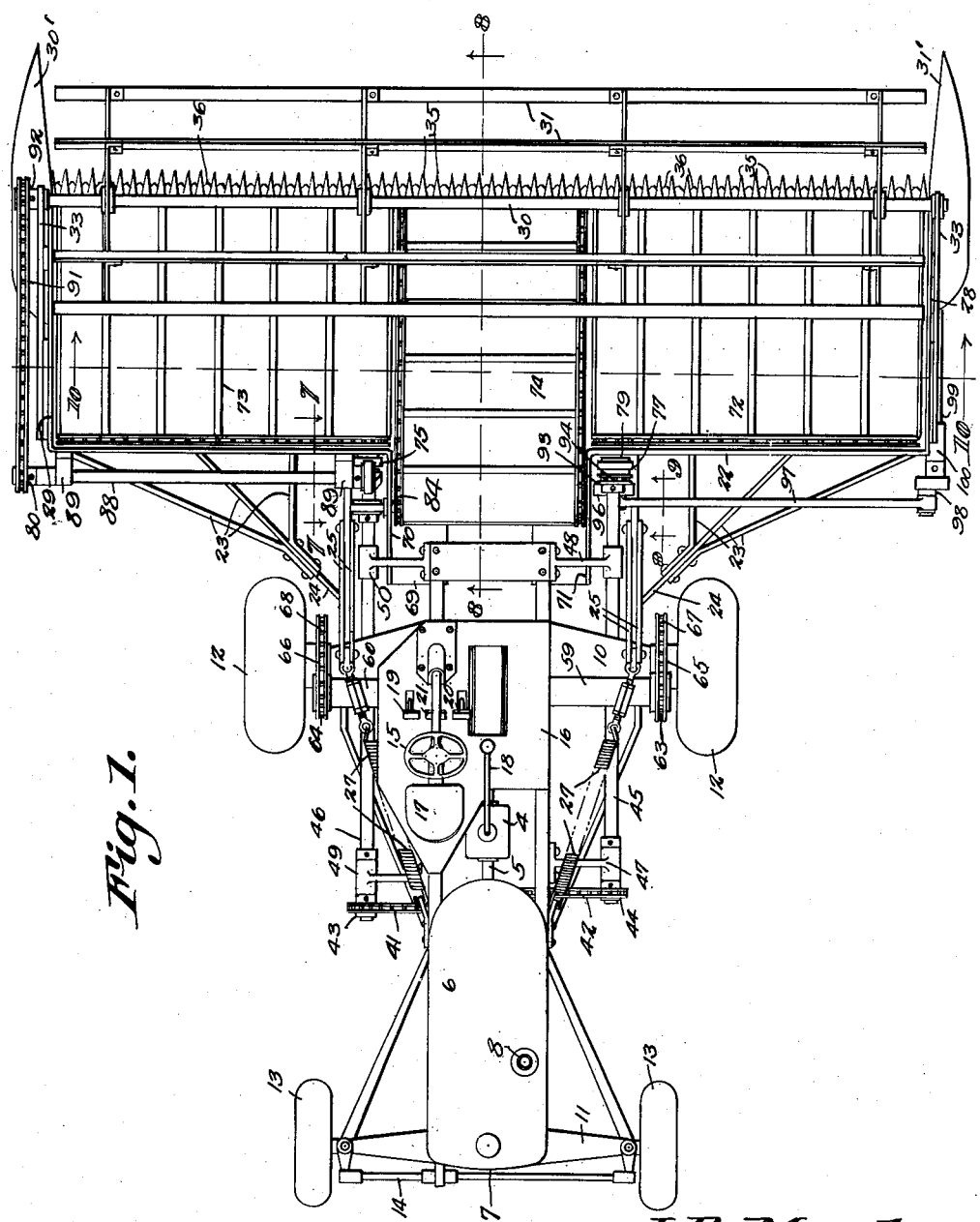
Figure 1 is a plan view of the improved harvester or swather.
Figure 9:
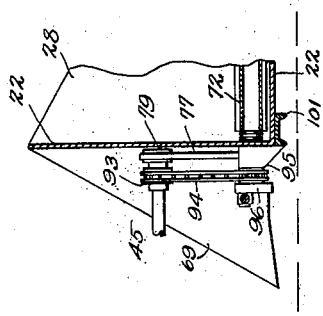
Figure 9 is a sectional view taken on the line 9—9 of Figure 1.
Figure 8:
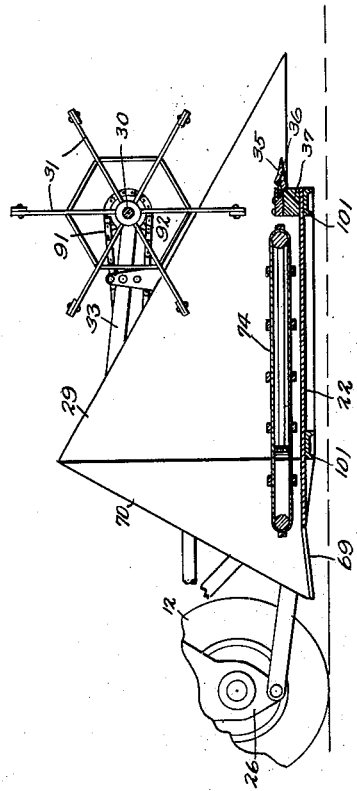
Figure 8 is a sectional view taken on the line 8—8 of Figure 1.
Figure 10:
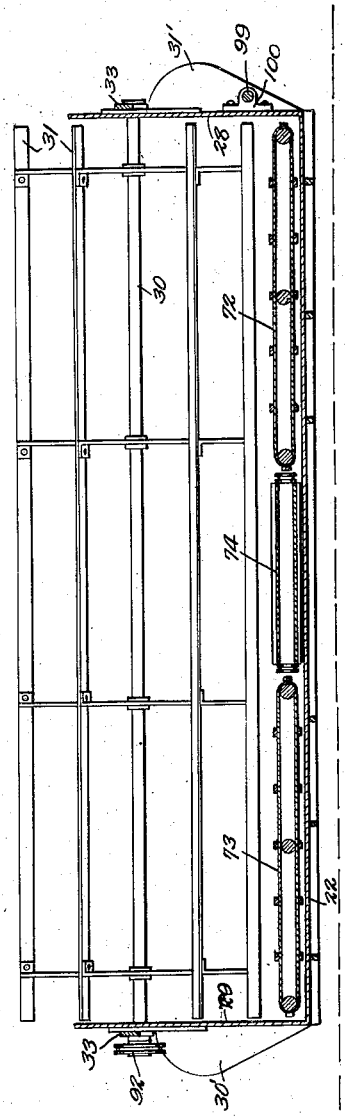
Figure 10 is a sectional view taken on the line 10—10 of Figure 1.
Figure 7:
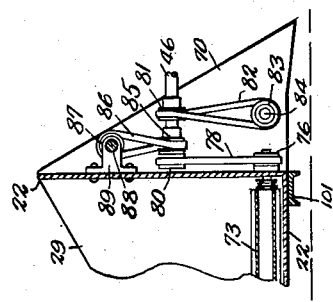
Figure 7 is a sectional view taken on the line 7—7 of Figure 1.

In carrying out the invention, there is provided an improved form of self-propelled and powered swather comprising a main supporting frame formed with transversely spaced longitudinally extending U-shaped channel iron frame members 1 and 2 set on their edges, with an internal combustion engine 3 secured between the rear ends thereof, and a transmission casing 4 disposed forwardly thereof, being connected with said engine 3 by means of the drive shaft 5. A gasoline tank 6 will be supported in spaced relation above the engine 3 as well as a cooling radiator 7 disposed at the rear end thereof. An exhaust muffler 8 will be provided for connection to the engine 3 by means of the pipe 8.

Inverted U-shaped supports or axles 10 and 11 will be provided at the front and rear of the main supporting frame, being attached thereto in any suitable manner, with the front axles supporting the large tired wheels 12 and the rear axles supporting the small tired wheels 13. The rear wheels 13 will be connected together by the radius rod 14 and will be steered by means of the steering wheel 15 extending through the platform 16 at the front end of the main frame.

A seat 17 will be provided for the driver of the swather, being placed adjacent the gear shift lever 18, and in a position for the feet of the driver to engage the brake and clutch pedals 19 and 20, and 21. Each of the front wheels 12 will be provided with separately controlled brakes operable by the brake pedals 19 and 20 to facilitate turning of the swather in a tight arc.

A substantially T-shaped draper or endless conveyor frame 22 is supported in front of the main frame by means of the bracing arms 23 and supporting arms 24 and 25 attached to and controlled by a hydraulic jack 26 and resiliently cushioned by means of the long springs 27 disposed at the opposite sides of the main frame.

The draper or endless conveyor frame 22 is formed with opposite ends 28 and 29 and guard boards 30' and 31', and rotatably support the transverse reel supporting shaft 30 upon which the reel 31 is secured for rotation. The mounting for the reel supporting shaft 30 comprises the vertical brackets 32 secured to the ends 28 and 29 and the cooperating supporting arms 33 secured at 34 to said ends 28 and 29.

A cutter bar having teeth 35 is reciprocably mounted at the front edge of the draper or endless conveyor frame 22 and cooperates with the fixed cutter teeth 36 supported upon the transversely extending rail 37 directly below the reel 31.

A clutch 38 and a pair of sprocket wheels 39 and 40 are supported by the drive shaft 5 between the motor 3 and the transmission casing 4, and the sprocket chains 41 and 42 are connected between the sprocket wheels 39 and 40 and the sprocket wheels 43 and 44 secured to the rear ends of the pair of power shafts 45 and 46 rotatably mounted in the bearing brackets 47 and 48, and 49 and 50 attached to the channel iron frame members 1 and 2. Chain tensioning sprockets 51 and 52 are supported by brackets 53 and 54 secured to the main frame members 1 and 2.

A universal joint 55 is connected between the drive shaft 56 extending forwardly from the transmission casing 4, and is connected with the shaft 57 which is connected with the differential gearing in housing 58. Oppositely disposed laterally extending shaft housings 59 and 60 are supported by the housing 58 and support the drive shafts 61 and 62, upon which the sprocket wheels 63 and 64 are fixed. Sprocket chains 65 and 66 extend about the sprocket wheels 63 and 64 and about the large sprocket wheels 67 and 68 secured to the large wheels 12 for driving the same.

The central rear portion of the draper or conveyor frame 22 is formed with a rearwardly extending discharge chute 69 having side walls 70 and 71 from which the swath is discharged centrally between the wheels 12 of the improved swather.

A pair of oppositely disposed drapers or endless conveyors 72 and 73 are supported in the outer ends of the conveyor supporting frame 22 for operation transversely of the frame 22, and moving inwardly when in operation. A centrally disposed longitudinally extending draper or endless conveyor 74 is positioned between the endless conveyors 72 and 73 and receives the grain after having been cut by the sickle bar teeth 35 and 36 and carried inwardly by the conveyors 72 and 73, then to be discharged as a swath from said conveyor 74. Pulleys 75 and 76 are attached to the inner ends of the endless conveyors 72 and 73 and are driven by the endless belts 77 and 78 which pass about the pulleys 79 and 80 on the forward ends of the power shafts 45 and 46.

A second pulley 81 on the shaft 46 drives an endless belt 82 which extends about the pulley 83 on the shaft 84 at the rear end of the endless conveyor 74.

The pulley 85 secured to shaft 46 drives an endless belt 86 which passes about the pulley 87 on the inner end of shaft 88 mounted for rotation in the brackets 89 on the rear of the conveyor frame 22, and a sprocket wheel 90 on the outer end the shaft 88 is connected by the sprocket chain 91 to a sprocket wheel 92 on the end of the reel supporting bar 30 for driving the reel 31.

A sprocket wheel 93 on the shaft 45 supports and drives the sprocket chain 94, which in turn extends about the sprocket wheel 95 connected with the eccentric 96 to which the pitman rod 97 is connected. The opposite end of the pitman rod 97 is connected with a crank 98 on the shaft 99 rotatably mounted in the brackets 100 on the end 28 of the conveyor supporting frame 22. The forward end of the shaft 99 is connected with the sickle bar for actuating the same.

Transversely extending U-shaped angle shoes 101 are secured to the bottom of the conveyor supporting frame 22 for reinforcing the same.

From the foregoing description, it will be apparent that there has been devised and provided a highly efficient form of self-powered and self-propelled swather which may be used any place in a field in connection with a combine, and that it may be efficiently used next to fences and without having to make double swaths.

While the preferred embodiment of the instant invention has been illustrated and described, it is understood that it is not intended to limit the scope of the invention thereto, as many minor changes in detail of construction may be resorted to without departure from the spirit of the invention.

What is claimed is:

In a self-propelled swather, a frame and a cutter bar operating at the front of the frame, a U-shaped axle on the frame, supporting wheels mounted at the lower ends of the U-shaped axle, a drive shaft extending through the axle, sprockets secured to the ends of the drive shaft, stub axles extending from the U-shaped axle, sprockets secured to the stub axles, said wheels being mounted on the stub axles, chains operating over the sprockets of the drive shaft and sprockets of the stub axles, rotating the supporting wheels, endless conveyors mounted on the frame, a motor mounted on the frame means for transmitting power from the motor to the drive shaft and endless conveyors operating the drive shaft and endless conveyors.

JOHN R. MUNTER.

REFERENCES CITED

The following references are of record in the file of this patent:

UNITED STATES PATENTS

| Number | Name | Date |
|---|---|---|
| 796,268 | Troeger | Aug. 1, 1905 |
| 885,157 | Hovland | Apr. 21, 1908 |
| 921,110 | Holly | May 11, 1909 |
| 1,312,389 | Converse | Aug. 5, 1919 |
| 1,906,498 | Templeton | May 2, 1933 |
| 1,932,717 | Wickersham | Oct. 31, 1933 |